US012632071B1

(12) United States Patent
Aharonoff

(10) Patent No.: US 12,632,071 B1
(45) Date of Patent: May 19, 2026

(54) INNOVATIVE TWO-STAGE PRESSURE CONTROL WATER VALVE

(71) Applicant: AQUAFLOW TECHNOLOGIES, INC., St. Petersburg, FL (US)

(72) Inventor: Aron Aharonoff, Fort Lauderdale, FL (US)

(73) Assignee: AQUAFLOW TECHNOLOGIES, INC., St. Petersburg, FL (US)

( * ) Notice: Subject to any disclaimer, the term of this patent is extended or adjusted under 35 U.S.C. 154(b) by 0 days.

(21) Appl. No.: 19/313,277

(22) Filed: Aug. 28, 2025

Related U.S. Application Data

(63) Continuation of application No. 19/191,589, filed on Apr. 28, 2025.

(51) Int. Cl.
| | |
|---|---|
| *F16K 15/06* | (2006.01) |
| *F16K 15/02* | (2006.01) |
| *G05D 16/10* | (2006.01) |

(52) U.S. Cl.
CPC ......... *G05D 16/103* (2013.01); *F16K 15/028* (2013.01); *F16K 15/063* (2013.01)

(58) Field of Classification Search
CPC ... G05D 16/103; F16K 15/028; F16K 15/026; F16K 15/064; F16K 15/063
See application file for complete search history.

(56) References Cited

U.S. PATENT DOCUMENTS

| | | | | | |
|---|---|---|---|---|---|
| 292,396 | A | * | 1/1884 | Ahrens | F16K 15/063 137/906 |
| 3,032,060 | A | * | 5/1962 | Huffman | F16K 15/144 137/859 |
| 2014/0182717 | A1 | * | 7/2014 | Edgeworth | F16K 15/063 137/540 |
| 2017/0101937 | A1 | * | 4/2017 | Schlarman | F16K 15/026 |
| 2017/0102085 | A1 | * | 4/2017 | Smith, III | F16K 27/003 |
| 2019/0024814 | A1 | * | 1/2019 | Mudra | F16K 15/063 |
| 2021/0048113 | A1 | * | 2/2021 | Trulear | F16K 25/005 |
| 2021/0239229 | A1 | * | 8/2021 | Kelton | F04B 1/0461 |

OTHER PUBLICATIONS

Vesconite bearings screenshot (Year: 2024).*

* cited by examiner

*Primary Examiner* — Kelsey E Cary
(74) *Attorney, Agent, or Firm* — POLLEY IP LAW, P.A.

(57) ABSTRACT

A novel valve device and related method of using that can provide for real-time pressure control adjustments and accurate meter reading when installed in a waterline. A two-stage pressure control system can comprise a dual-spring mechanism engineered for precise and adaptive water flow regulation. Water can enter the valve through the one or more inflow ports at an inlet end, travel through the body, and exit through the one or more outflow ports at an outlet end or through side windows in the valve body for certain embodiments. As a result, the dual-spring mechanism can generate backpressure. When water mixed with air flows through the waterline, the valve can create backpressure upstream causing the air at or near the meter to compress for a more accurate meter reading.

20 Claims, 13 Drawing Sheets

101

104

102

104A

104B

100

110

130  131    138    139

110B

100

110

105   103   115

100

110 103 120

130

105 115 101 120

120

130

FLOW WATER DIRECTION

Pipe Line
220

100
Water Valve 211
home owner side

201
City Side

210
Water Meter

220 Pipe Line

200

INNOVATIVE TWO-STAGE PRESSURE CONTROL WATER VALVE

This application is a continuation of U.S. application Ser. No. 19/191,589, filed Apr. 28, 2025, which is incorporated by reference in its entirety for all purposes.

FIELD OF DISCLOSURE

The disclosure relates generally to water valves.

BACKGROUND OF THE INVENTION

Traditional meters, especially mechanical ones, are unable to differentiate between air and water. Instead, the meters simply spin, or pulse based on flow volume. If air bubbles are present, the bubbles increase the total volume passing through the meter, resulting in over-register of the meter. Furthermore, traditional pressure control valves rely on external power sources or electronic sensors to make adjustments.

It is overcoming or reducing one or more of the above issues found with current meters and pressure control valves that the below described novel valve device and method is directed to.

SUMMARY OF THE INVENTION

A novel valve device and related method of using the novel valve device is shown and disclosed and can provide for real-time pressure control adjustments and accurate meter reading. A two-stage pressure control system can comprise a dual-spring mechanism engineered for precise and adaptive water flow regulation. Preferably, the valve device can operate seamlessly across two distinct pressure stages. The first pressure stage can be a low-pressure stage and the second pressure stage can be a high or higher pressure stage. The valve device can automatically transition between control modes upon reaching predefined pressure thresholds.

The valve device can comprise (i) a shaft having a shaft arm and a shaft head that includes a top shaft head surface and a bottom shaft head surface, (ii) a body having one or more inflow ports and a retaining groove, (iii) a first spring, (iv) a second spring, (v) a bushing, (vi) a top shaft guide having one or more outflow ports, (vii) and an optional retaining clip in certain embodiments. The body can include one or more flow-enhancement windows.

The springs can be disposed around the shaft arm. The top shaft head can be disposed within the body such that shaft head covers one or more inflow ports when the first spring is in an expanded configuration. The Bushing can be securely attached to or received with the top shaft guide, forming a bushing-shaft guide assembly. The bushing-shaft guide assembly can be disposed within the body, such that when the shaft is moved, the shaft arm fits or is at least partially received (yet preferably movable) within/inside the bushing shaft assembly. The retaining clip can be inserted into retaining groove disposed at the exit end of the body to maintain the other components in position within the valve body, particularly, though not limiting, for smaller size valves/valve bodies.

Preferably, water can enter the valve device through the one or more inflow ports (which can preferably be a single centrally located inflow port located at the inlet end of the body, travel through the body, and exit through the one or more outflow ports at the exit end of the body or through one of the openings/cutouts in the body (when provided). Water entering the one or more inflow ports pushes on the top shaft head in the water flow direction. As a result, the shaft head moves in the water flow direction (i.e. inward within the body). As the shaft arm moves inward with respect to the top shaft guide, the first spring, which at one end can be contacting the bushing shaft guide assembly (preferably the bushing portion), compresses (though contact of the opposite end of the first spring with the bottom surface of the shaft head. This results in a more difficult movement of the shaft and a buildup of backpressure. After the first spring is compressed to a specified distance, which can be based on a calibrated tension, the second spring which can already e similarly in contact with the bushing portion at one end, can come into contact at its opposite end with the bottom surface of the shaft head (once the shaft head has been moved inward within the valve body) such that the second spring becomes operational and also begins to compress for creating additional backpressure, preferably along with the continual compression of the first spring.

Additionally, as the shaft head is pushed inward within the valve body in view of the pressure of the water inflow, the outer end of the shaft arm can correspondingly move through an opening (preferably central opening) in the shaft guide assembly, and depending on the length of movement of the shaft/shaft head within the novel valve, the outer end of the shaft arm can be extending beyond the exit/outflow end of the valve body.

A method showing how the valve device can simultaneously regulate both pressure and flow and compress gas is also disclosed. The valve device can be installed in a pipe near a volume water meter. When water mixed with air flows through the valve device, the valve device can create backpressure upstream using the dual-spring mechanism. Since gases are compressible and fluids are incompressible, the created backpressure can compress air that is mixed in the water.

Since the volume water meter measures volume, a lesser (almost negligible) amount of air passing through can be measured, due to the disclosed novel valve's ability to compress upstream air. Once the water passes through the volume water meter and the valve device, the pressure can drop, and the air can expand back to its original state.

Accordingly, a novel valve is disclosed herein and can comprise: (i) a body having one or more inflow ports; (ii) a shaft having a shaft arm and a shaft head, the shaft head having a top surface and a bottom surface; (iii) a first spring, preferably conical or virtually/substantially conical in shape (though not limiting); (iv) a second spring, preferably straight in shape (though not limiting); (v) a bushing; and (vi) a top shaft guide having one or more outflow ports. The first spring can be disposed around at least a portion of the length to virtually the entire or a majority of the length of the shaft arm and the second spring can also be disposed around at least a portion of the length of the shaft arm. The length of the second spring in an expanded configuration can preferably be shorter than the length of the first spring in an expanded configuration, such that the compression of the first spring by through contact with the shaft head upon inward movement of the shaft head preferably doesn't also compress the second spring until the shaft head has traveled a certain distance inward within the valve body/valve passageway. Preferably, the first and second springs are both loosely/freely (i.e. preferably unsecured) disposed around the shaft arm and the second spring can be smaller in outer dimension size as compared to the first spring, so that the second spring can be preferably disposed within the interior space defined by the first spring. The force of the water entering the valve/valve passageway causes the first ends of both springs to be positioned and contacting the outer edge/ledge of the bushing, such that the compression of the springs can be based or primarily based on when their opposite ends come into contact with the bottom surface of the shaft head. The bushing can be secured to the top shaft guide forming a bushing-shaft guide assembly. The bushing-shaft guide assembly can be disposed within the body, such that the shaft arm of the shaft is in movable contact with the bushing, and the shaft head can be disposed between the one or more inflow ports and the bushing shaft guide assembly, with the two springs maintained between the shaft head and the bushing-shaft guide assembly whether in an expanded, partially compressed or compressed position/configuration.

A novel method of real-time water pressure control adjustments is also disclosed herein and can comprise: (i) disposing a shaft inside a valve body, with the shaft having a shaft head and a shaft arm and with the valve body have one or more inflow ports and an optional retaining groove (preferably for smaller valve dimensions where creating internal threads within the internal surface of the valve body at the outflow end would be impracticable or difficult) particularly in view of the valve body wall thickness for smaller valves; (ii) disposing a first spring around the shaft arm; (iii) disposing a second spring around the shaft arm; (iv) securing a bushing to a top shaft guide forming a bushing shaft guide assembly; (v) disposing the bushing shaft guide assembly inside the valve body such that the shaft head being disposed therebetween the one or more inflow ports and the bushing shaft guide assembly; (vi) inserting a retaining clip in the retaining groove (when provided), the retaining clip securing or maintaining the shaft, the first spring, the second spring, and the bushing shaft guide assembly within the valve body. For larger dimension valves, the retaining groove can be replaced with internal threads and mating external threads can be providing on the shaft guide housing that allows the shaft guide housing to be secured to the valve body by the mating of the threads. Preferably, when mating the shaft guide housing within the valve body, the bushing can be secured thereto and a portion or the outer end of the shaft arm can be snugly, yet movably, received within the bushing and the two springs can be disposed around the shaft arm. Accordingly, securement of the shaft guide assembly to the valve body (within the internal passageway of the valve body) can also properly align the shaft, springs and bushing also within the internal passageway. Similarly, where the retaining clip embodiment is provided, the bushing, springs and shaft can be similarly connected to the shaft guide assembly, such that positioning the shaft guide assembly within the internal passageway of the valve body also causes these preferred components to also be properly positioned within the internal passageway of the valve body, when the retaining clip is disposed within the retaining groove in the internal surface of the valve. A fluid entering the one or more inflow ports pushes on the shaft head, causing the shaft head to move the shaft inward within the passageway and in a direction of fluid flow. As the first spring is contacting the shaft head and the bushing shaft guide assembly (preferably the bushing portion), the movement of the shaft head inward causes compressing of the first spring. At some point the inward movement of the shaft head also comes into contact with the second spring, which is also contacting the bushing-shaft guide assembly (preferably the bushing portion), which upon further inward movement of the shaft head causes the second spring to begin compressing preferably along with the continual compressing of the first spring. The fluid exits the valve passageway of the valve body through the one or more outflow ports.

In certain embodiments, the valve body can also be provided with one or more cutouts, slots, openings etc. which provide further escape/exits areas for the water/fluid entering the valve body/passageway at the inlet/inflow port of the passageway, in additional to the exit/outflow openings at the opposite end of the valve body.

DETAILED DESCRIPTION OF THE INVENTION

Figure 1A:
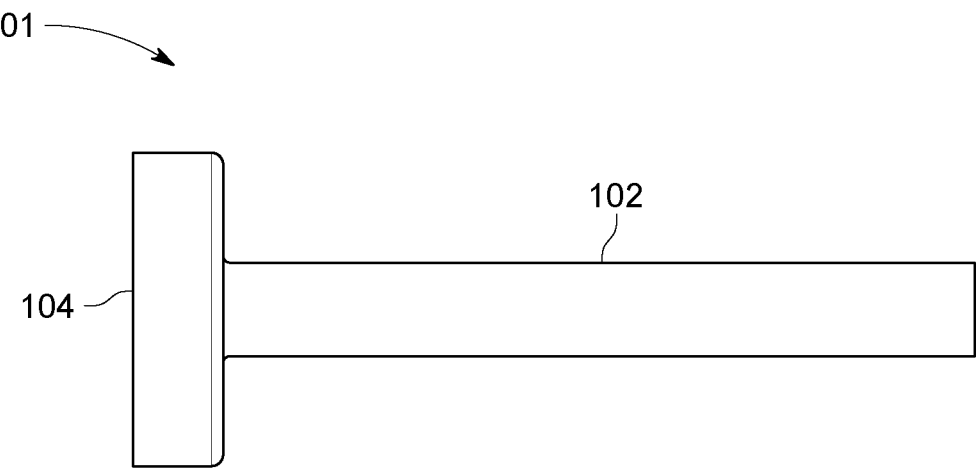
FIG. 1A illustrates a side view of a non-limiting embodiment for a shaft of the novel valve device of the current disclosure.
Figure 1B:
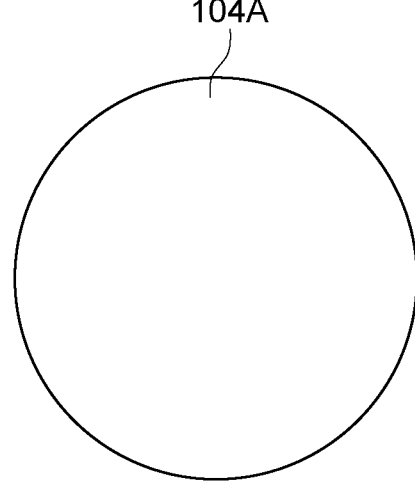
FIG. 1B illustrates a top view of a non-limiting embodiment for a shaft of the novel valve device of the current disclosure.
Figure 1C:
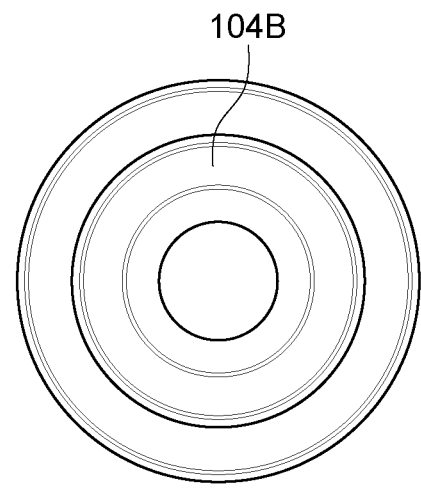
FIG. 1C illustrates a bottom view of a non-limiting embodiment for a shaft of the novel valve device of the current disclosure.

A water valve device designed to create controlled backpressure upstream of a water meter to compress entrained air in the water flow. By utilizing the physical property that fluids are incompressible while gases are compressible, the device can ensure or help to ensure that only the true volume of water passes through the meter, eliminating meter overreadings caused by air bubbles. The valve can then allow decompression downstream, returning flow to its normal state without affecting downstream equipment.

As seen in the drawings, a novel valve device 100 and related method of using valve device 100 is shown and disclosed and can provide for real-time pressure control adjustments and accurate meter reading. Valve device 100 can be a two-stage pressure control system. The two-stage pressure control system can comprise a dual-spring mechanism engineered for precise and adaptive water flow regulation. In other words, the two-stage pressure control system can combine two springs 103 and 105 as part of a mechanical mechanism to create backpressure. The dual-spring mechanism can act similarly to a check valve, allowing flow in one direction and preventing reverse flow that can damage meters/equipment or contaminate the supply line.

Preferably, valve device 100 can operate seamlessly across two distinct pressure stages. The first pressure stage can be a low water pressure stage (i.e. about 35-55 psi though not limiting) and the second pressure stage can be a high or higher water pressure stage (i.e. about 55-90 psi though not limiting). In a non-limiting embodiment, valve device 100 can automatically transition between control modes upon reaching predefined pressure thresholds. In this regard, valve device 100 can ensure accuracy and efficiency in water pressure management.

In a non-limiting embodiment, valve device 100 can comprise a shaft 101 having a shaft arm 102 and a shaft head 104 that includes top shaft head surface 104a and bottom shaft head surface 104b, a body 110 having one or more inflow ports 111 and a retaining groove 138 (in certain embodiments), a first spring 103, a second spring 105, a bushing 120, a top shaft guide 130 having one or more outflow ports 131, and an optional retaining clip 139 in certain embodiments (i.e. when retaining groove 138 is provided). Body 110 can also include one or more flow-enhancement windows 115. In a non-limiting embodiment, valve device 100 can include four flow-enhancement windows 115. Flow-enhancement windows 115 can increase flow efficiency and boost inline pressure preferably by about 1-2 psi, which optimizes the overall system performance.

Figure 2:
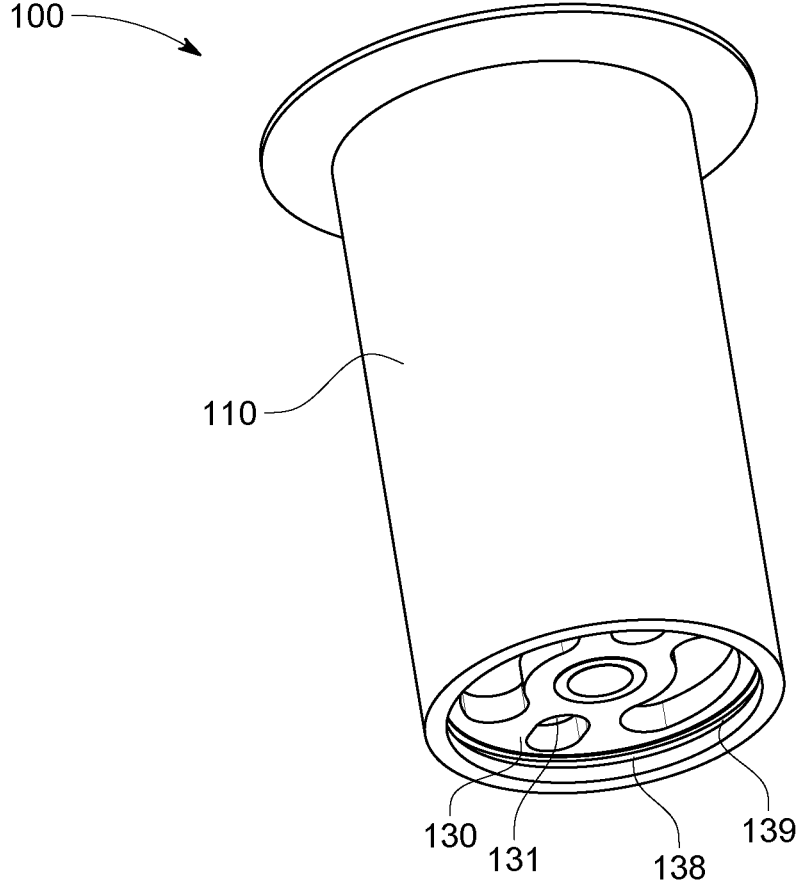
FIG. 2. illustrates a perspective view of a non-limiting embodiment for an assembled novel valve device with a solid-body design in accordance with the current disclosure.
Figure 3:
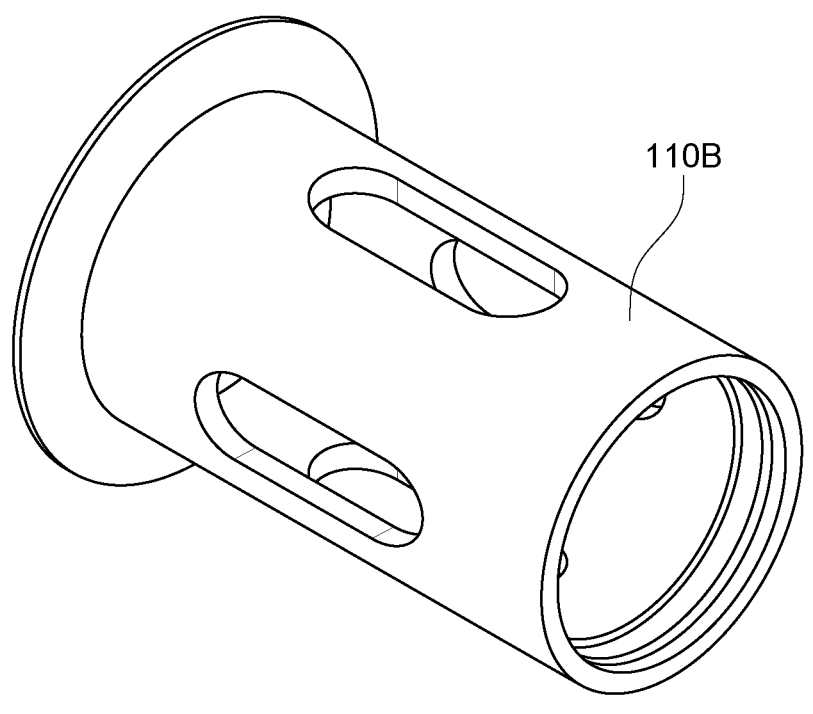
FIG. 3. illustrates a perspective view of a non-limiting embodiment for a body with windows of the novel valve device of the current disclosure.
Figure 4:
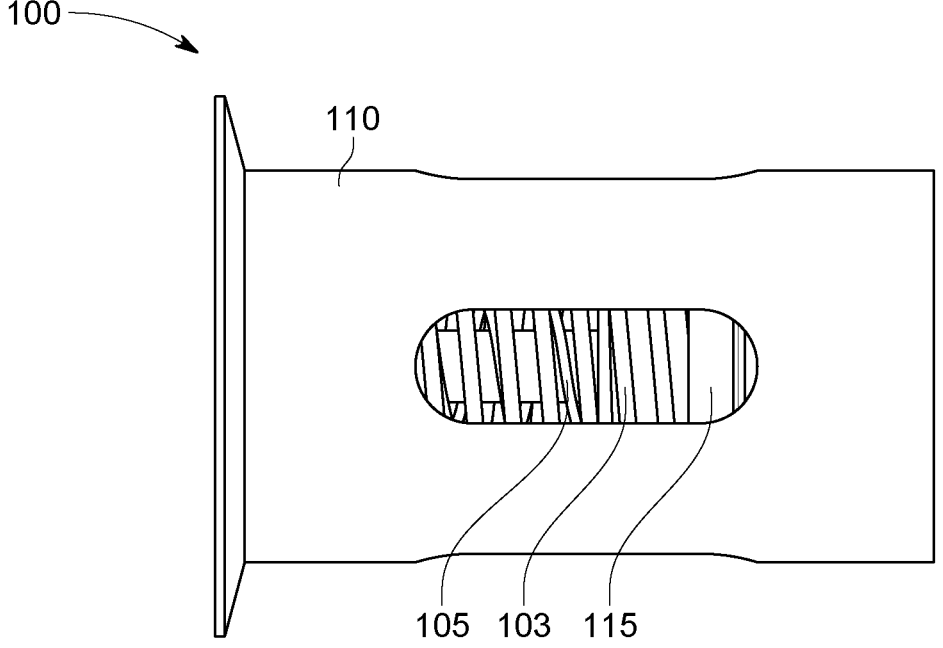
FIG. 4 illustrates a side view of a non-limiting embodiment for an assembled novel valve device in accordance with the current disclosure.
Figure 5:
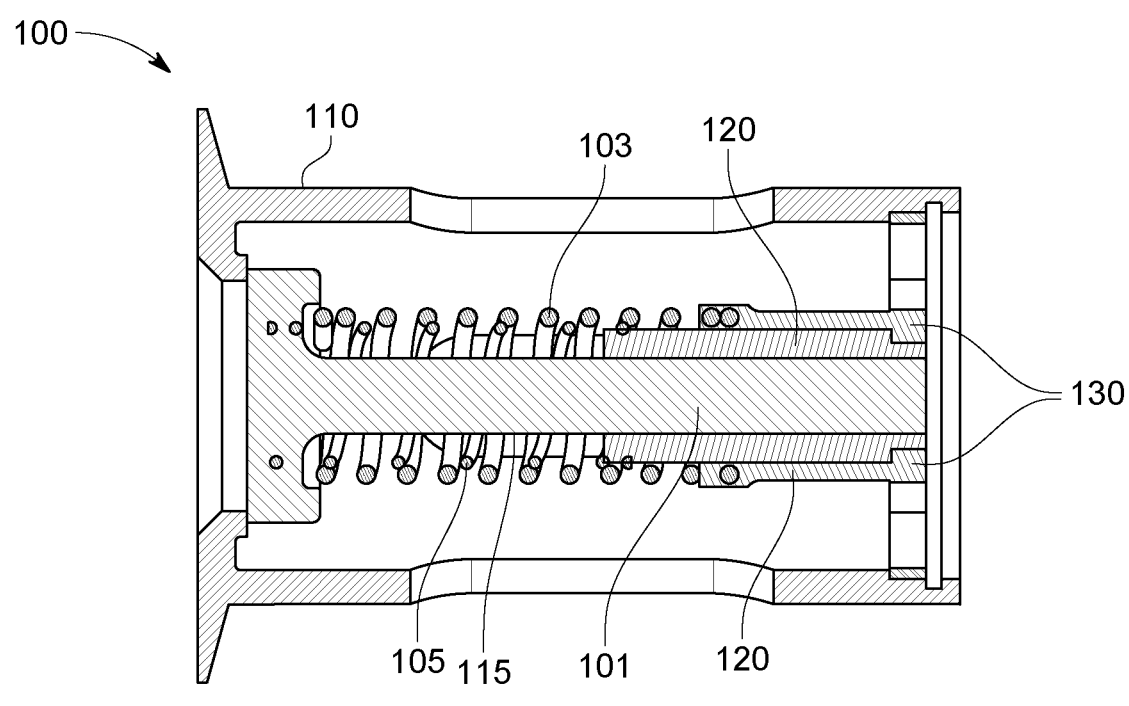
FIG. 5 illustrates a side cross-sectional view of a non-limiting embodiment for the assembled novel valve device of FIG. 4.
Figure 6:
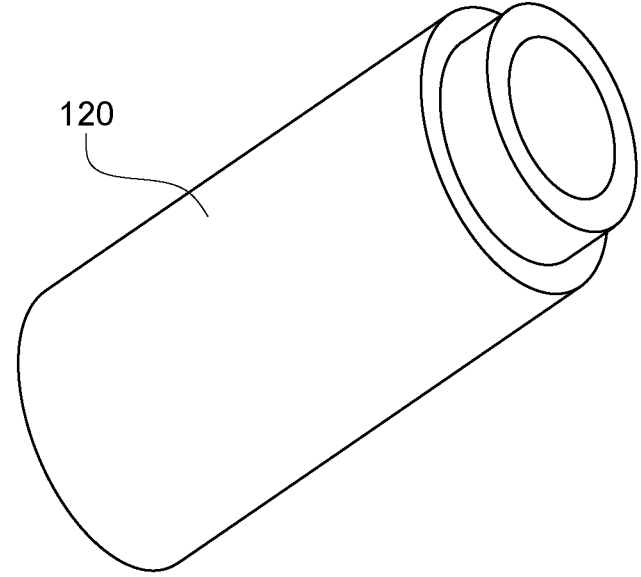
FIG. 6 illustrates a perspective view of a non-limiting embodiment for a bushing of the novel valve device of the current disclosure.
Figure 7:
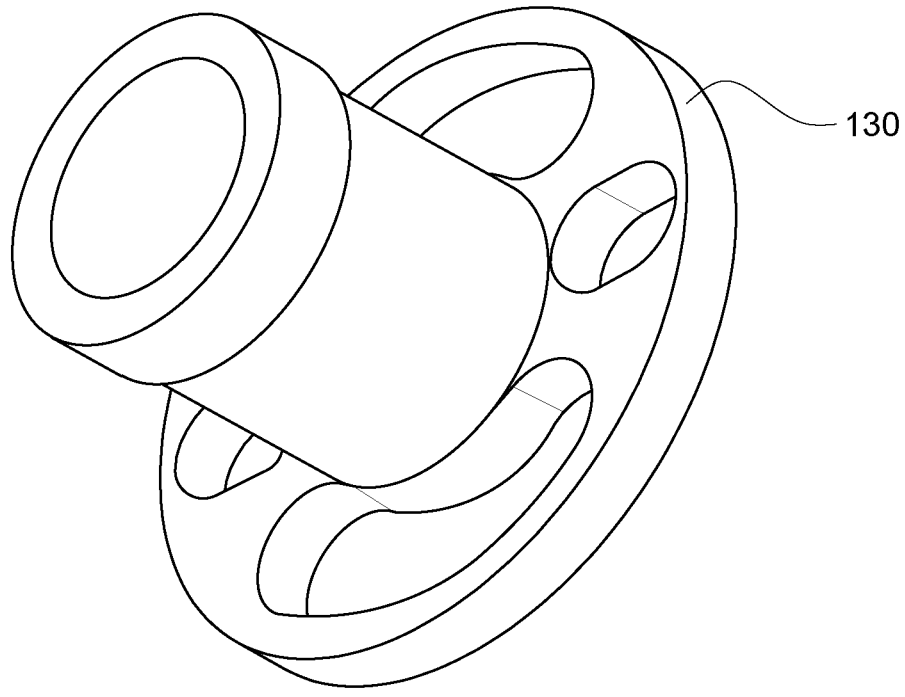
FIG. 7 illustrates a perspective view of a non-limiting embodiment for a top shaft guide/shaft guide of the novel valve device of the current disclosure.
Figure 8:
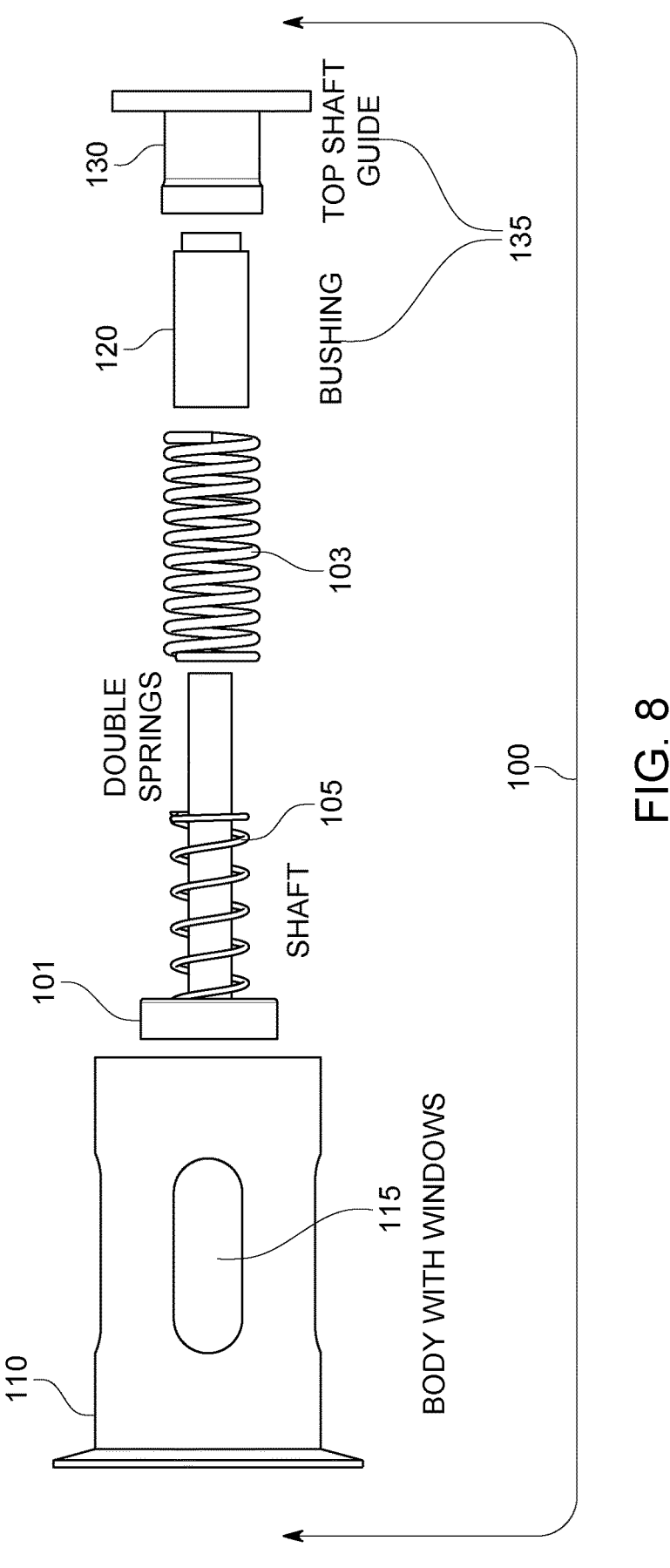
FIG. 8 illustrates an exploded side view of a non-limiting embodiment for the novel valve device of the current disclosure.
Figure 9:
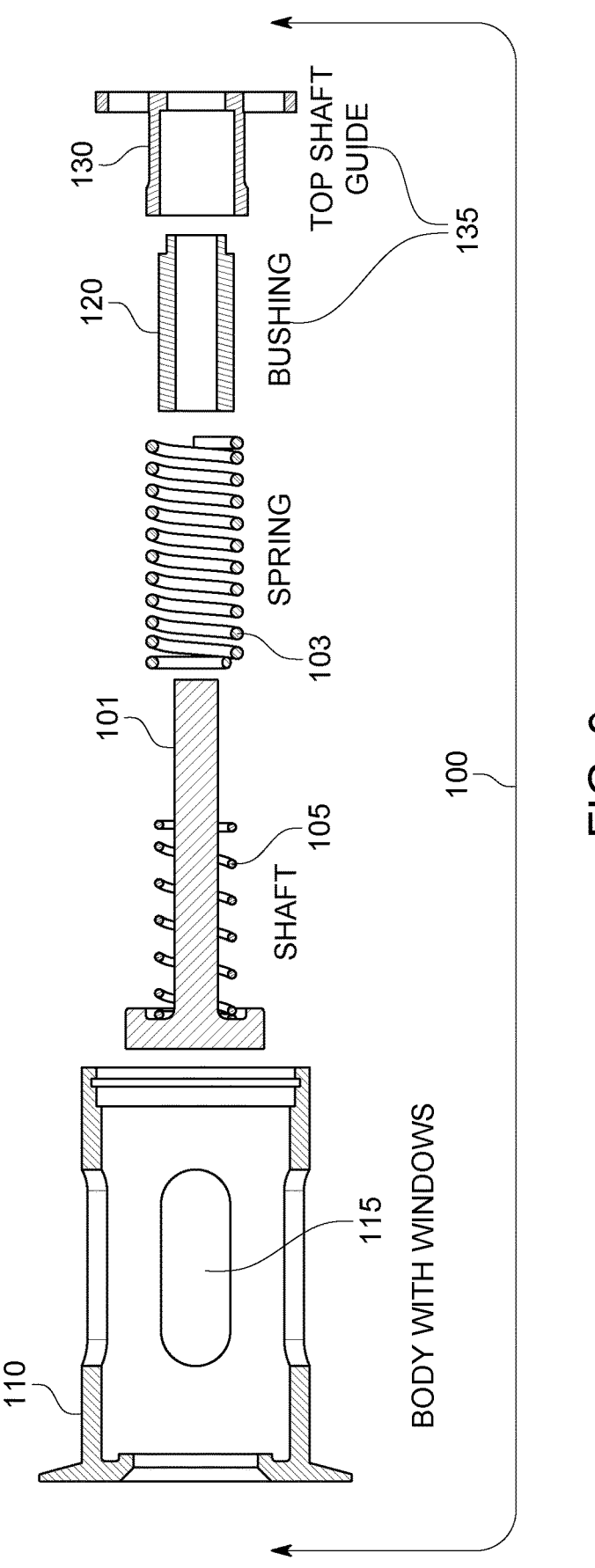
FIG. 9 illustrates a cross-sectional exploded side view of a non-limiting embodiment for the novel valve device of the current disclosure.
Figure 10:
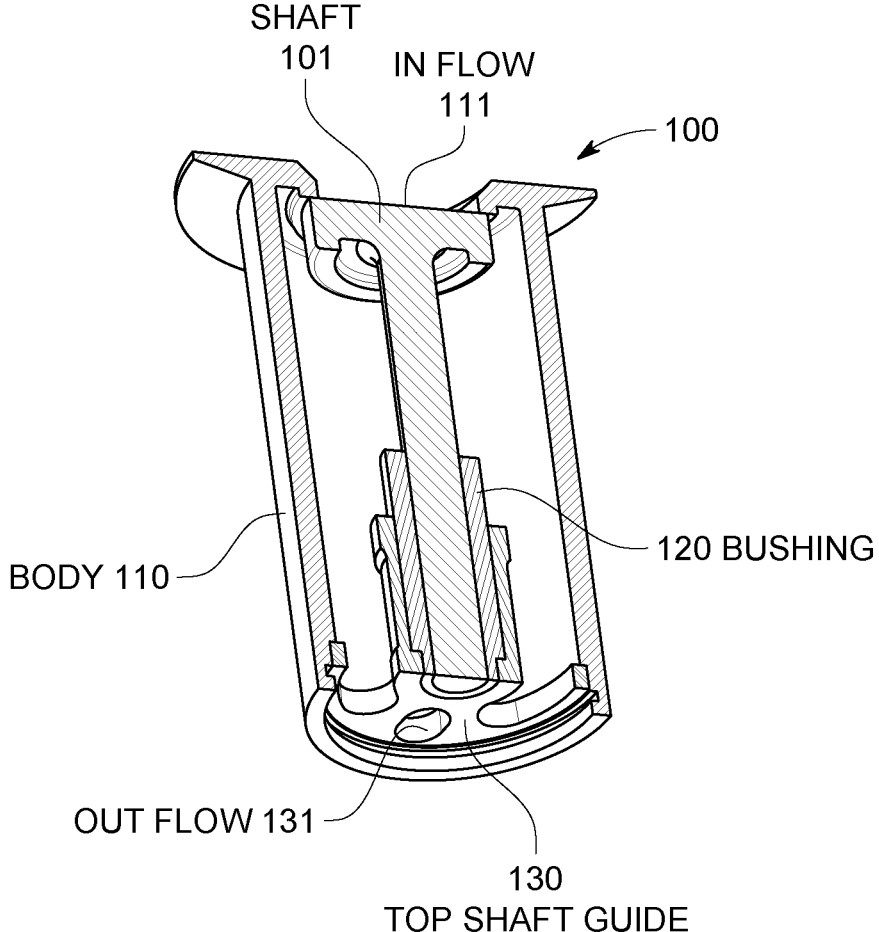
FIG. 10 a cross-sectional perspective view of a non-limiting embodiment for an assembled novel valve device (minus the springs and retaining clip) of the current disclosure.
Figure 11:
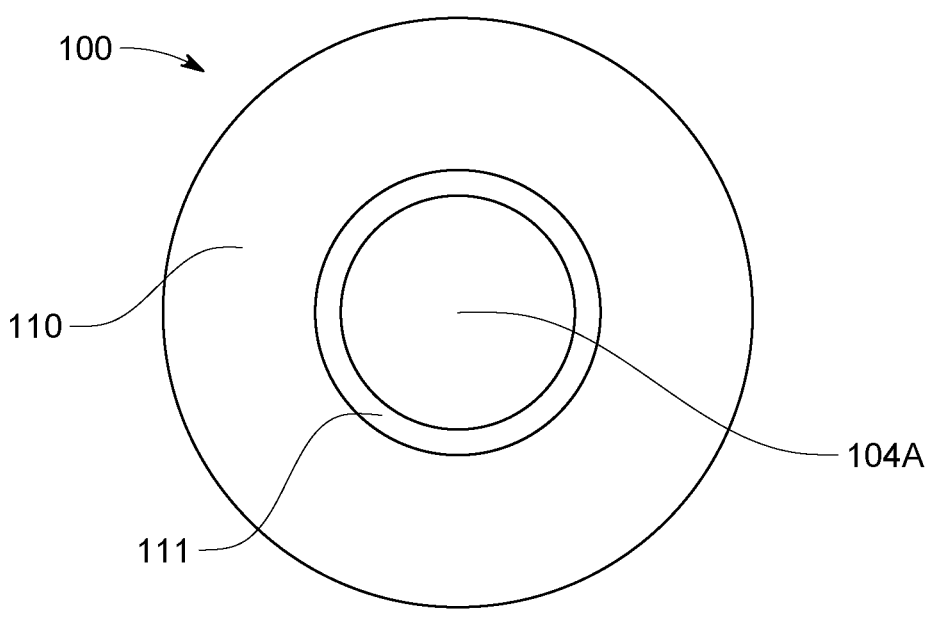
FIG. 11 illustrates a top view or inlet/inflow end of a non-limiting embodiment for an assembled novel valve device of the current disclosure.
Figure 12:
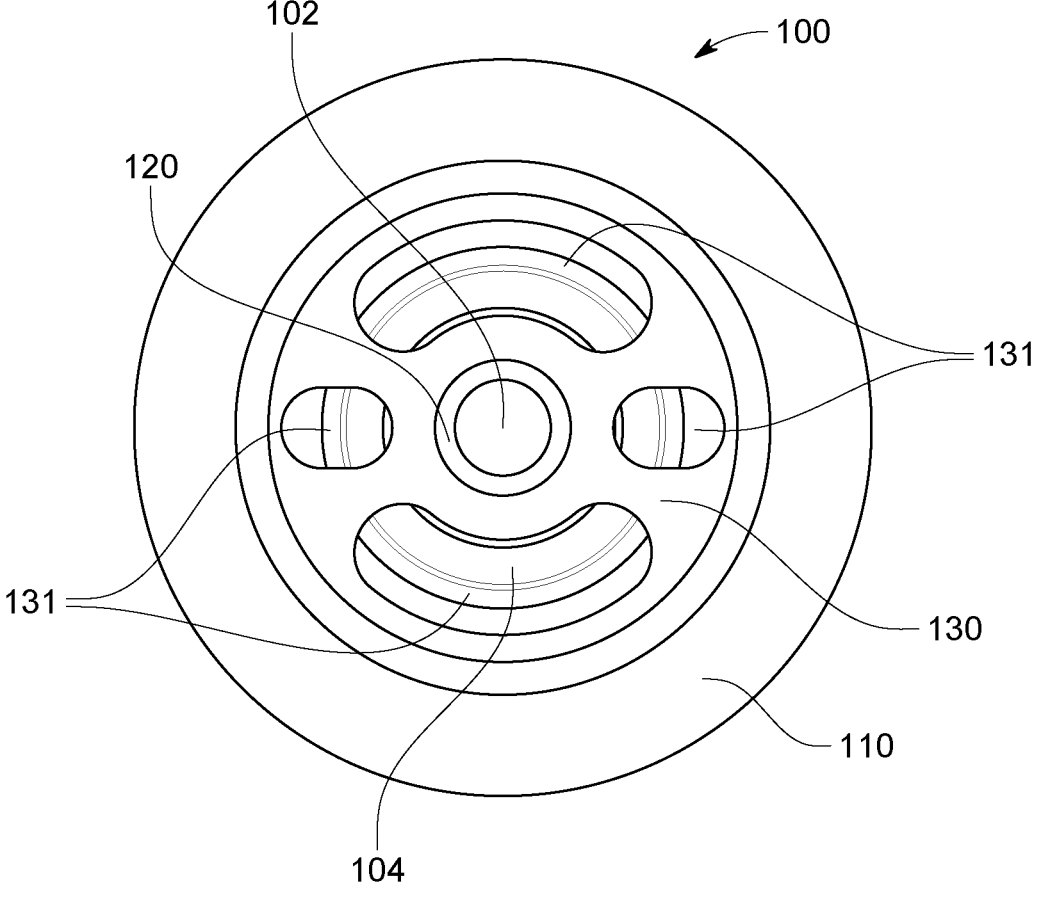
FIG. 12 illustrates a bottom view or outlet/outflow end of a non-limiting embodiment for an assembled novel valve device of the current disclosure.

As shown in FIGS. 2 and 3, Valve device 100 can comprise two distinct valve body configurations 110A, 110B. A first configuration 110A can be a standard solid-body design without flow-enhancement windows 115. A second configuration 110B can be an enhanced version featuring precision-engineered flow-enhancement windows 115. Both configurations 110A, 110B can maintain identical dimensional compatibility and installation parameters. The primary distinction can be the one or more windows 115 in second configuration 110B, which facilitates increased downstream pressure and improved flow characteristics. Second configuration 110B can elevate downstream pressure by about 1-2 psi and can increase volumetric flow rates by about 2-4%, particularly in installations where low pressure and reduced flow conditions are present. As such, flow-enhancement windows 115 can significantly enhance the performance of valve device 100, optimizing water distribution without the need for external power sources or additional system modifications.

In a preferred non-limiting embodiment, springs 103, 105 can be disposed around shaft arm 102, with one end of spring 103 configured or sized such that it can preferably be in contact with the bottom surface 104b of shaft head 104 preferably at all times, which allows the expansion of spring 103 to push against shaft head 104 to seal off the internal passageway of valve 110a or 110b at the inlet/inflow point of valve 100, until water flow/water pressure traveling in the water line towards valve 100 is sufficient to cause spring 103 to compress through inward movement of shaft head 104, to allow water to enter in the valve passageway through inflow/inlet 111. Thus, shaft head 104 can be disposed within body 110 such that shaft head 104 covers one or more inflow ports 111 when first spring 103 is in an expanded configuration.

Bushing 120 can be securely attached to or received with top shaft guide 130, forming a bushing-shaft guide assembly 135. Preferably, bushing 120 can be secured to top shaft guide 130 by a press fit with glue, though other securement methods/materials/mechanisms can also be used and considered within the scope of the disclosure. Bushing-shaft guide assembly 135 can be disposed within body 110, such that when shaft 101 is moved, shaft arm 102 fits or is at least partially received (yet preferably movable) within/inside bushing-shaft assembly 135 in a way where bottom of shaft arm 102 is movable through top shaft guide 130 corresponding to the water pressure pressing/pushing against shaft head 104 and the sides/outer surface of shaft arm 102 can contact bushing 120. To ensure bushing-shaft guide assembly 135 remains disposed within body 110, in certain valve embodiments, retaining clip 139 can be inserted into retaining groove 138 disposed at the exit end of body 110 to maintain the other components in position within body 110. Though not limiting, the combination retaining groove 138 and retaining clip 139 can be preferably used with for smaller size valves/valve bodies 110, especially where the thickness of the valve wall is not sufficient to allow threads to be formed therein. For larger sizes of valve 100, preferably, internal threads can be formed and mating external threads can be provided on shaft guide 130, with the threads mating when attaching shaft guide 130, and which secure shaft guide 130 in place. However, it is within the scope of this disclosure that retaining groove 138 and retaining clip 139 can be used for all sizes of valve 100 and the use of internal threads and external mating threads can be used for all sizes of valve 100.

Preferably, second spring 105 can be disposed around shaft arm 102 and first spring 103 can be disposed around shaft 102 and can encompass second spring 105. By way of non-limiting example, first spring 103 can be longer than second spring 105. First spring 103 can also preferably be conical in shape (FIGS. 15, 16) and can be thicker than second spring 105. However, first spring 103 can also be straight or straighter, as well as uniform in shape/outer diameter dimensions.

Preferably, water (but any fluid is considered within the scope of this disclosure) can enter valve device 100 through one or more inflow ports 111 (which can preferably be a single centrally located inflow port 111 located at the inlet end of body 110), travel through body 110, and exit through one or more outflow ports 131 or windows 115 when provided. Water entering one or more inflow ports 111 pushes on top shaft head surface 104*a* in the water flow direction (i.e. inward within body 110). As a result, shaft 101 moves in the water flow direction. As shaft arm 102 moves inward with respect to top shaft guide 130, first spring 103, which at one end can be contacting bushing-shaft guide assembly 135 (preferably bushing 120), compresses (though contact of the opposite end of first spring 103 with bottom surface 104*b* of shaft head 104). This results in a more difficult movement of shaft 101 and a buildup of backpressure. The extra length of first spring 103 results in first spring 103 being the primary and initial creator of backpressure, as first spring 103 can be in earlier contact with bottom shaft head 104*b* and bushing shaft guide assembly 135, as compared to second spring 105.

The flow of the water within the valve passageway, causes one end of the shorter length freely disposed second spring 105 to be positioned or adjacent at and preferably contacting bushing edge/ledge of bushing 120. Since second spring 105 can be shorter than first spring 103 when both are in an expanded state/configuration, as shaft arm 102 moves inward and compresses first spring 103, the outer end of second spring 105 moves closer to bottom surface 104*a* of shaft head 104. After first spring 103 is compressed to a specified distance which can be based on a calibrated tension and through contact with bottom surface 104*a*, second spring 105 which can also be similarly in contact with bushing 120 at one end and with bottom shaft head 104*b* at its opposite end (once shaft head 104 has been moved inward within valve body 110) such that second spring 105 becomes operational and also begins to compress for creating additional backpressure, preferably along with the continual compression of first spring 103 Both springs 103, 105 can operate together. Though not limiting, springs 103, 105 can be made from stainless steel 316-L, bushing 120 can be made from VESCONITE or other thermopolymer material and top shaft guide 130 can be made from stainless steel 316-L.

Additionally, as shaft head 104 is pushed inward within valve body 110 in view of the pressure of the water inflow, the outer end of shaft arm 102 can correspondingly move through an opening (preferably central opening) in bushing-shaft guide assembly 135, and depending on the length of movement of shaft 101/shaft head 104 within novel valve 100, the outer end of shaft arm 102 can be extending beyond the exit/outflow end of valve body 110.

In another non-limiting embodiment, springs 103, 105 can be positioned inside shaft arm 102 and fixed to and/or positioned to touch bottom surface 104*b* of shaft head 104.

Valve device 100 can eliminate the need for external power sources, as valve device 100 can rely on a mechanical transition mechanism that continuously experiences and responds to real-time water pressure conditions.

By way of non-limiting embodiment, valve device 100 can operate under a primary control mode when water pressure is between about 35-55 psi. In a primary control mode, first spring 103 can maintain optimal flow and stability. When pressure exceeds about 55 psi, valve device 100 can instantly activate second spring 105. Second spring 105 can manage increased pressure while preventing fluctuations.

As water pressure fluctuates, valve device 100 can enable a smooth, automatic transition between control stages to ensure consistent performance under varying conditions.

In a non-limiting embodiment, first spring 103 can be or be considered a low-pressure spring and second spring 105 can be or be considered a high-pressure spring. Though preferably first and second springs 103 and 105, respectively are freely (i.e. unsecured) disposed around, first spring 103 can be fixed to and/or positioned to touch bottom surface 104*b* of shaft head 104 and second spring 105 can remain disengaged until needed and/or second spring 105 can be fixed to bushing 120 and/or step guide 130. As pressure increases, first spring 103 can compress until it reaches its calibrated tension (typically about 30-50 psi but preferably either 30-55 psi or 35-55 psi). Once first spring 103 reaches its calibrated tension, second spring 105 can activate/compress (based on the then location of shaft head 104 within the valve passageway and the expanded length/configuration of second spring 105, providing additional resistance and maintaining regulation within the higher-pressure range of about 55-90 psi. When the pressure reaches the threshold at which second spring 105 begins to compress, first spring 103 can continue to compress, as well. Springs 103, 105 can operate together in parallel or unison from that point forward, both undergoing simultaneous compression until the full stroke or end of travel is reached. Preferably, first spring 103 is not fully compressed at the onset of second spring's 105 activation and first spring 103 remains active and contributes force throughout the compression range.

Figure 13:
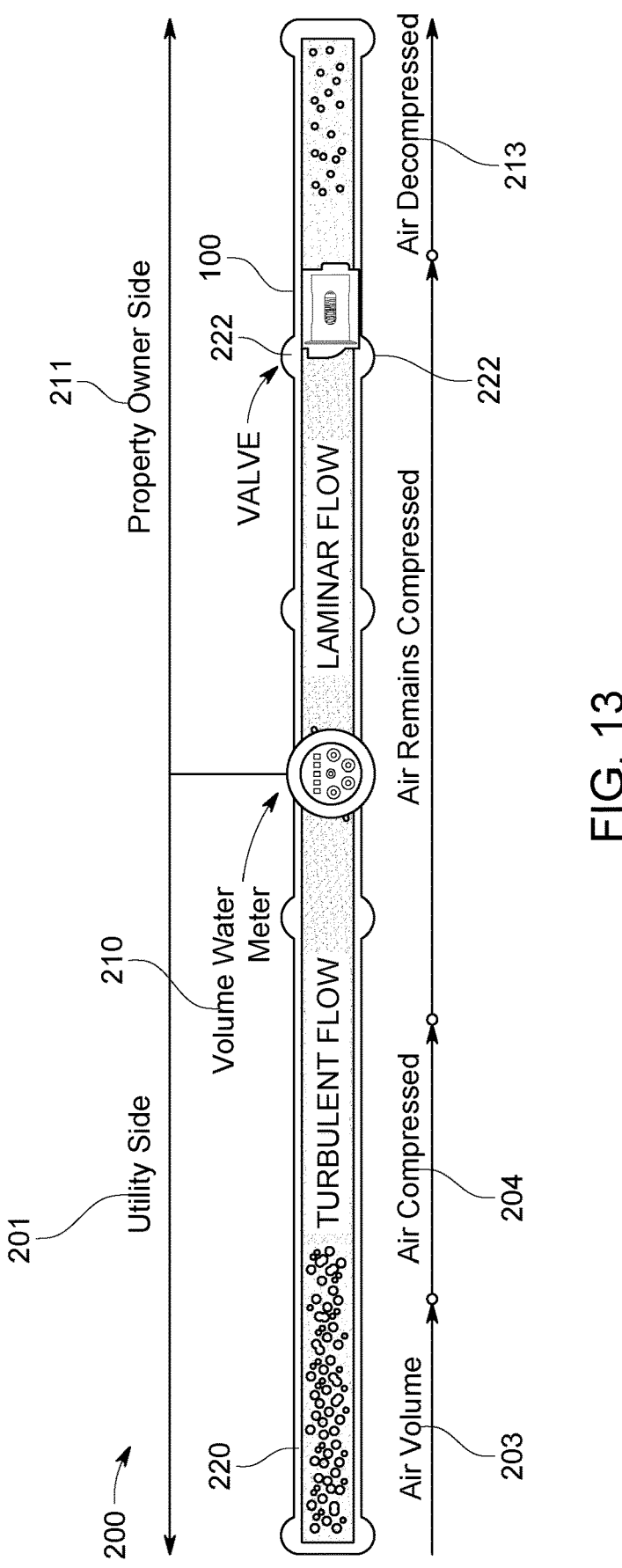
FIG. 13 illustrates a flow diagram/schematic for a non-limiting example of the novel method of use and showing the novel valve disposed within a waterline in accordance with the current disclosure.
Figure 14:
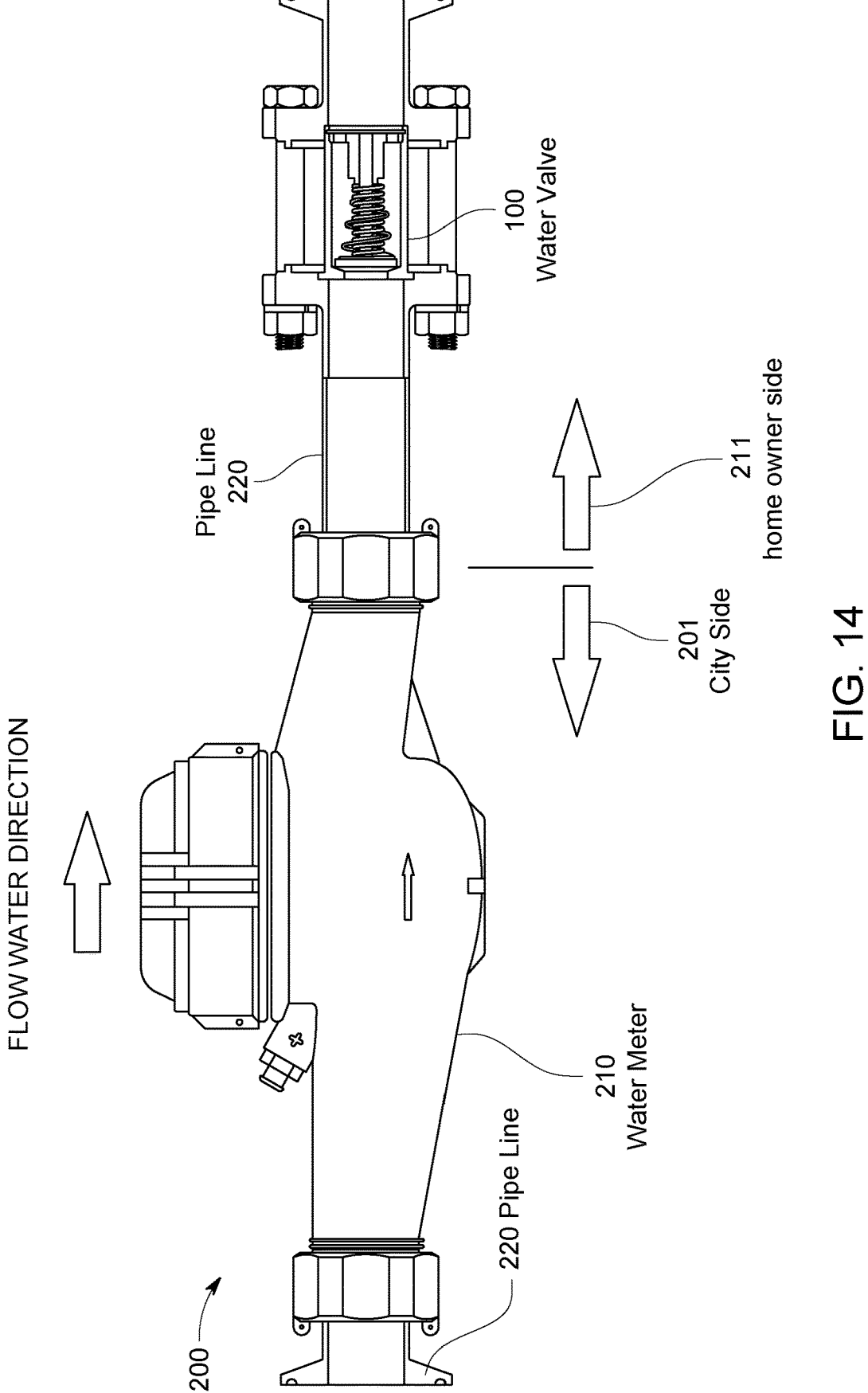
FIG. 14 illustrates another flow diagram/schematic for a non-limiting example of the novel method of use and showing the novel valve disposed within the waterline in accordance with the current disclosure.

FIGS. 13 and 14 disclose a novel method and "in use" schematic/configuration 200 showing how valve device 100 can simultaneously regulate both pressure and flow and compress gas. This integrated control can improve the accuracy of water meter readings (resulting in more accurate billing or monitoring) and extend a volume water meter's 210 operational life by eliminating pressure surges and hydraulic shock (commonly known as water hammer) that typically occur within pipeline systems and can cause long-term damage to metering devices. Valve 100's compression mechanism and pressure-dampening behavior can help to absorb and reduce the effects of water hammer, especially those originating downstream. As such, valve device 100 can protect both itself and volume water meter 210 from hydraulic shock by regulating and preventing excessive pressure building in the water line. The reduction in sudden pressure surges and mechanical stress on internal components of volume water meter 210 can help extend volume water meter's 210 operational life.

By way of non-limiting method, valve device 100 can be installed near volume water meter 210 on a property owner side 211 (based or as determined by the location of volume water meter 210. Valve device 100 can be positioned inside a waterline/pipe 220, between couplings 222, and seats securely around the internal diameter of pipe 220. Water with air volume can enter pipe 220 at 203, flowing from utility side 201 to property owner side 211. When water mixed with air flows through valve device 100, valve device can create backpressure upstream on a utility side 201. Since gases are compressible and fluids are incompressible, the created backpressure can compress air that is mixed in the water at 204. After compression, the volume of the air is significantly reduced to an almost negligible amount, while the volume of water remains the same.

Since volume water meter 210 measures volume, volume water meter 210 typically records both air and water volume passing therethrough. With the use of valve device 100, volume water meter 210 can measure a lesser (almost negligible) amount of air passing through, due to disclosed novel valve's 100 ability to compress upstream air. Once the water passes through volume water meter 210 and valve device 100, the pressure can drop and the air can decompress back to its original state at 213.

Preferably, valve device 100 can act as a pressure regulator or flow restrictor to hold pressure right behind the meter. That pressure can compress entrained air to reduce the space taken by the entrained air. As such, volume water meter 210 can reduce the amount of overcount stemming from the air. In essence, valve device 100 can turn frothy water into clean, dense flow before being measured at volume water meter 210. Valve device 100 can hold enough pressure between itself and volume water meter 210 to prevent cavitation or aeration, force air into solution (or at least compress it), and stabilize flow so volume water meter 210 receives a steady, dense stream of water.

To ensure smooth, non-turbulent fluid motion, one or more laminar flow stabilizers can be positioned both upstream and/or downstream of valve device 100. The one or more laminar flow stabilizers can ensure smooth, non-turbulent fluid motion to enable optimal air compression and accurate measuring at volume water meter 210.

By integrating the advanced dual-spring architecture with the precision-engineered mechanical transition system, valve device 100 can redefine water valve functionality. Valve device 100 can offer superior durability, enhanced reliability, and reduced maintenance, setting a new benchmark in high-performance water pressure regulation.

Valve device 100 can provide a robust, scalable, and highly efficient solution for water flow control, delivering industry-leading performance in commercial, industrial, and residential applications.

The two-stage pressure control system of valve device 100 can integrate a dual-spring mechanism for superior performance, reliability, and efficiency in water flow regulation. Valve device 100 can preferably be designed to automatically adjust water pressure based on real-time conditions, ensuring optimal performance across two distinct pressure stages: (i) low pressure mode (about 35-55 psi) and (ii) high pressure mode (about 55-90 psi). In a low-pressure mode, valve device 100 can regulate flow while maintaining system stability. In a high-pressure mode, valve device 100 can engage an advanced spring system to control increased pressure and prevent fluctuations. By seamlessly transitioning between low pressure mode and high-pressure mode, valve device 100 can provide precise pressure regulation, significantly reducing system strain while optimizing efficiency.

Unlike traditional pressure control valves that rely on external power sources or electronic sensors, valve device 100 can employ a sophisticated mechanical transition mechanism. The sophisticated mechanical transition mechanism can enable real-time adjustments based solely on water pressure. As such, valve device 100 can be (i) highly efficient by responding instantly to pressure variations, (ii) energy-independent by operating without electricity or external controls, and (iii) extremely durable by minimizing wear and maintenance needs.

As noted above, novel valve device 100 can use a novel dual-spring design, which can be engineered to handle different pressure ranges with unmatched precision. First spring 103, preferably for psi ranging about 35-55, can ensure consistent water flow at lower pressures, preventing instability and ensuring smooth operation. Second spring 105, preferably for psi ranging above 55, can be engaged to effectively regulate and distribute pressure without abrupt shifts. Preferably, the system can detect the change in psi by the automatic movements of shaft head 104 within the valve passageway and once shaft head 104 has moved inward to a certain length within valve body 110a or 110b, shaft head 104b automatically contacts and engages second spring 105.

The dual-spring design can dynamically transition between control modes, maintaining stable performance under fluctuating pressure conditions.

In addition to precision control capabilities, valve device 100 can also feature strategically placed flow-enhancement windows 115 around valve body 110. In a non-limiting preferred embodiment, valve body 110 can include four flow-enhancement windows 115. Flow-enhancement windows 115 can (i) increase flow efficiency by optimizing internal fluid dynamics, (ii) boost inline pressure by an additional 1-2 psi, enhancing system performance, and (iii) reduce pressure drops, ensuring continuous and stable water supply.

Novel valve device 100 can redefine water valve functionality by delivering the following key non-limiting advantages, benefits and/or characteristics: (i) superior durability, (ii) reduced maintenance, (iii) scalability and versatility, and (iv) enhanced water efficiency. Though not limiting, valve device 100 can be built from high-quality, corrosion-resistant materials. Valve device 100 can also eliminate complex electrical components, minimizing service requirements. Additionally, valve device 100 can be suitable for commercial, industrial, and residential applications. Valve device 100 can further optimize pressure regulation, reducing excess water use and lowering costs.

By integrating a dual-spring mechanism with an innovative mechanical transition mechanism, valve device 100 can set a new benchmark in high-performance water pressure regulation. Valve device 100 can provide a robust, scalable, and highly efficient solution for precise water flow control, making it an industry-leading innovation in fluid dynamics.

Figure 15:
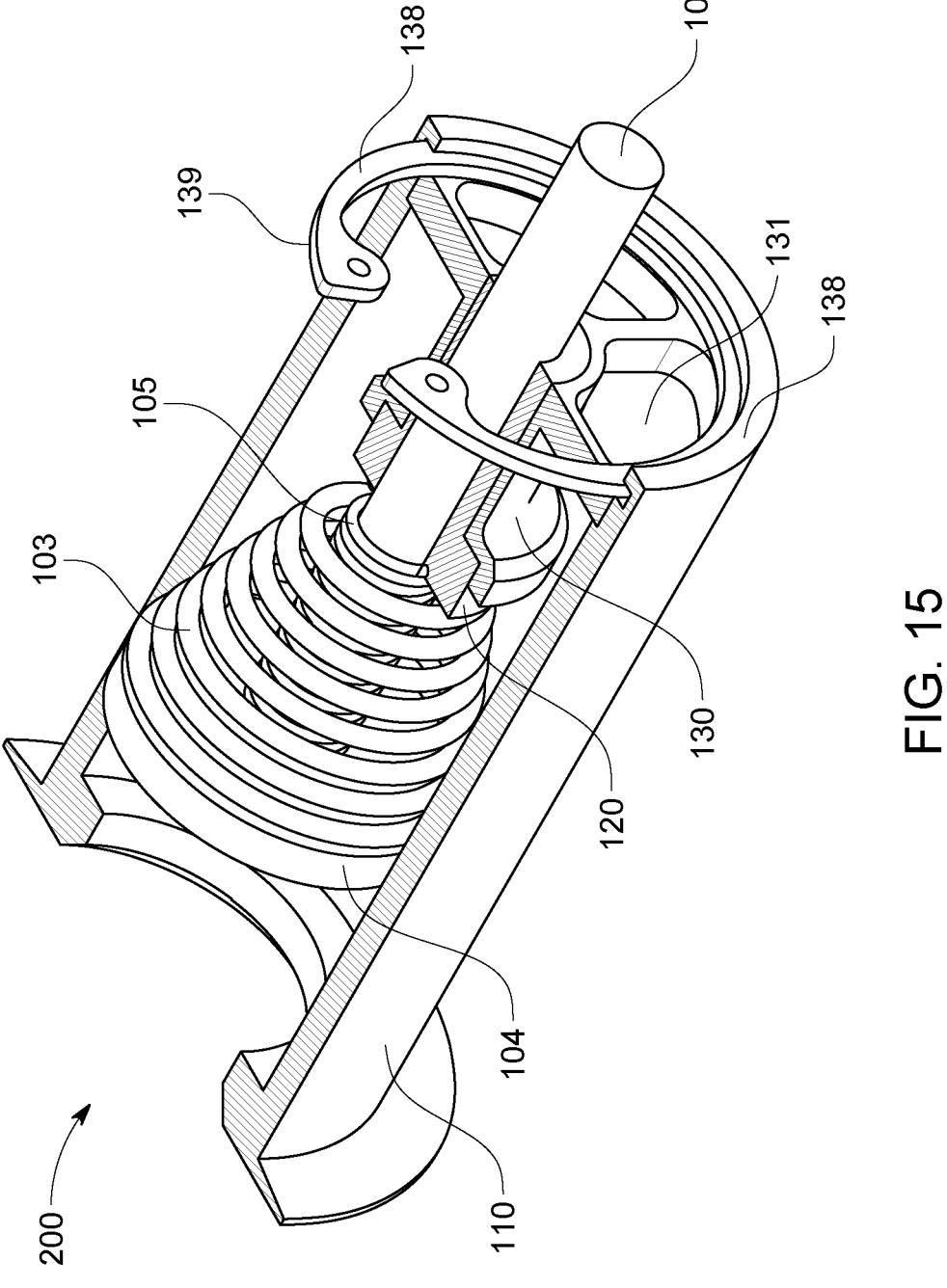
FIG. 15 illustrates a perspective, partial sectional, view of a non-limiting embodiment for an assembled novel valve device of the current disclosure showing the interior of the valve and where a retaining clip is provided and disposed within the retaining groove.
Figure 16:
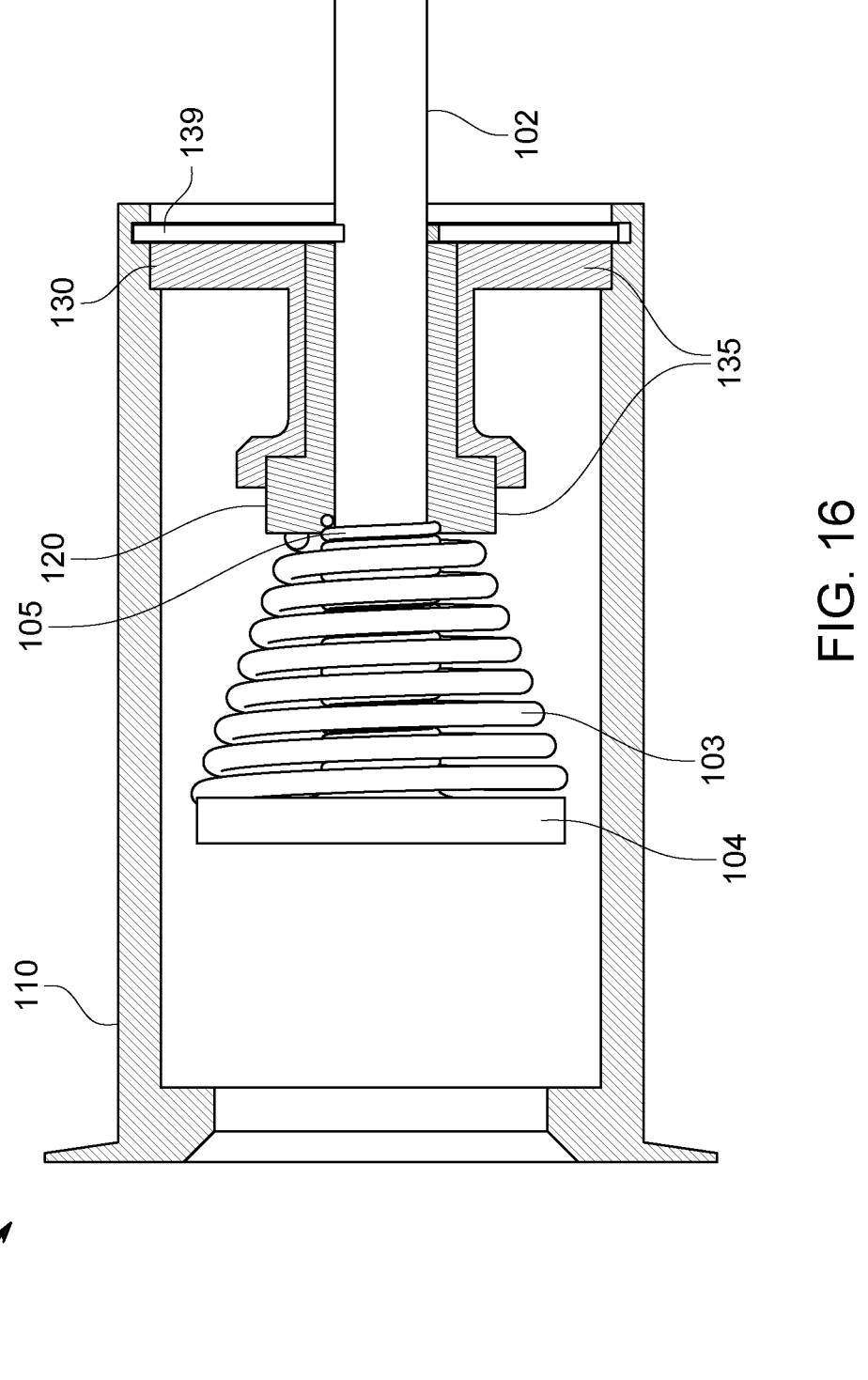
FIG. 16 illustrates a side, partial sectional, view of the novel valve device of FIG. 15.

Accordingly, novel valve 100 is disclosed herein and can comprise: (i) body 110 having one or more inflow ports 111; (ii) shaft 101 having shaft arm 102 and shaft head 104, shaft head 104 having top surface 104a and bottom surface 104b; (iii) first spring 103, preferably conical or virtually/substantially conical in shape (though not limiting) (FIGS. 15, 16); (iv) second spring 105, preferably straight in shape (though not limiting); (v) bushing 120; and (vi) top shaft guide 130 having one or more outflow ports 131. First spring 103 can be disposed around at least a portion of the length to virtually the entire or a majority of the length of shaft arm 102 and second spring 105 can also be disposed around at least a portion of the length of shaft arm 102. The length of second spring 105 in an expanded configuration can preferably be shorter than the length of first spring 103 in an expanded configuration, such that the compression of first spring 103 by through contact with shaft head 104 upon initial inward movement of shaft head 104 preferably doesn't also compress second spring 105 until shaft head 104 has traveled a certain distance inward within valve body 110/valve passageway. Preferably, first and second springs 103, 105 can both be loosely/freely (i.e. preferably unsecured) disposed around shaft arm 102 and second spring 105 can be smaller in outer dimension size as compared to first spring 103, so that second spring 105 can be preferably disposed within the interior space defined by first spring 103. The force of the water entering valve 100/valve passageway causes the first ends of both springs 103, 105 to be positioned and contacting the outer edge/ledge of bushing 120, such that the compression of springs 103, 105 can be based or primarily based on when their opposite ends come into contact with bottom surface 104b of shaft head 104. Bushing 120 can be secured to top shaft guide 130 forming bushing-shaft guide assembly 135. Bushing-shaft guide assembly 135 can be disposed within body 110, such that shaft arm 102 of shaft 101 is in movable contact with bushing 120 and shaft head 104 can be disposed between one or more inflow ports 111 and bushing-shaft guide assembly 135, with two springs 103, 105 maintained between shaft head 104 and bushing-shaft guide assembly 135 whether in an expanded, partially compressed or compressed position/configuration.

A novel method of real-time water pressure control adjustments is also disclosed herein and can comprise: (i) disposing shaft 101 inside valve body 110, with shaft 101 having shaft head 104 and shaft arm 102 and with valve body 110 having one or more inflow ports 111 and optional retaining groove 138 (preferably for smaller valve dimensions where creating internal threads within the internal surface of the valve body at the outflow end would be impracticable or difficult) particularly in view of the valve body wall thickness for smaller valves; (ii) disposing first spring 103 around shaft arm 102; (iii) disposing second spring 105 around shaft arm 102; (iv) securing bushing 120 to top shaft guide 130, forming bushing-shaft guide assembly 135; (v) disposing bushing-shaft guide assembly 135 inside valve body 110 such that shaft head 104 being disposed therebetween one or more inflow ports 111 and bushing-shaft guide assembly 135; (vi) inserting retaining clip 139 in retaining groove 138 (when provided), retaining clip 139 securing or maintaining shaft 101, first spring 103, second spring 105, and bushing-shaft guide assembly 135 within valve body 110. For larger dimension valves, retaining groove 138 can be replaced with internal threads and mating external threads can be providing on the shaft guide housing that allows the shaft guide housing to be secured to valve body 110 by the mating of the threads. Preferably, when mating the shaft guide housing within valve body 110, bushing 120 can be secured thereto and a portion or the outer end of shaft arm 102 can be snugly, yet movably, received within bushing 120 and two springs 103, 105 can be disposed around shaft arm 102. Accordingly, securement of bushing-shaft guide assembly 135 to valve body 110 (within the internal passageway of valve body 110) can also properly align shaft 101, springs 103, 105 and bushing 120 also within the internal passageway. Similarly, where retaining clip 139 embodiment is provided, bushing 120, springs 103, 105 and shaft 101 can be similarly connected to bushing-shaft guide assembly 135, such that positioning bushing-shaft guide assembly 135 within the internal passageway of valve body 110 also causes these preferred components to also be properly positioned within the internal passageway of valve body 110, when retaining clip 139 is disposed within retaining groove 138 in the internal surface of valve 100. A fluid entering one or more inflow ports 111 pushes on shaft head 104, causing shaft head 104 to move shaft 101 inward within the passageway and in a direction of fluid flow. As first spring 103 is contacting shaft head 104 and bushing-shaft guide assembly 135 (preferably bushing 120 portion), the movement of shaft head 104 inward causes compressing of first spring 103. At some point the inward movement of shaft head 104 also comes into contact with second spring 105, which is also contacting bushing-shaft guide assembly 135 (preferably bushing 120 portion), which upon further inward movement of shaft head 104 causes second spring 105 to begin compressing preferably along with the continual compressing of first spring 103. The fluid exits the valve passageway of valve body 110 through one or more outflow ports 131.

In certain embodiments, valve body 110 can also be provided with one or more cutouts, slots, windows, openings etc. 115 which provide further escape/exits areas for the water/fluid entering valve body 110/passageway at inlet/ inflow port 111 of the passageway, in additional to the exit/outflow openings 131 at the opposite end of valve body 110.

Some non-limiting advantages, features, benefits and/or characteristics for the disclosed novel valve can include: (i) valve device 100 can be installed after volume water meter 210 on property owner side 211; (ii) valve device 100 can be installed after volume water meter 210, preferably up to ten feet away from volume water meter 210; (iii) valve device 100 can be manufactured in Titanium Grade 5 material; (iv) body 110 of valve device 100 can be solid (i.e. no windows) or have flow-enhancement windows 115 (e.g. preferably one to four windows 115 on body 110); and (v) valve device 100 can be intended for commercial, agricultural, governmental, industrial and residential uses.

The exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the Figures, it will be understood by those of ordinary skill in the art that various changes in form and details may be made therein without departing from their spirit and scope.

All components/elements of the described device/method and their locations, communication/connection methods between the device components, valves, dimensions, materials, values, sizes, locations, shapes, etc. discussed above or shown in the drawings, if any, are merely by way of example and are not considered limiting and other component(s) and their locations, communication/connection methods between the device components, valves, dimensions, materials, values, sizes, locations, shapes, etc. can be chosen and used and all are considered within the scope of the disclosure.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

All locations, sizes, shapes, proportions, measurements, amounts, angles, component locations, part locations, fasteners, configurations, weights, dimensions, values, percentages, ranges, materials and/or orientations discussed above or shown in the drawings are merely by way of example and are not considered limiting and other locations, sizes, shapes, proportions, measurements, amounts, angles, component locations, part locations, fasteners, configurations, weights, dimensions, values, percentages, ranges, materials and/or orientations can be chosen and used and all are considered within the scope of the disclosure.

While the novel valve device and related method has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A valve for controlling pressure of a liquid flowing through a conduit, the valve comprising:
a body having an inflow port at an inlet end and having an opening at an outlet end;
a shaft having a shaft arm and a shaft head, the shaft head having a top surface and a bottom surface;
a first spring disposed around the shaft arm and contacting the bottom surface of the shaft head;
a second spring disposed around the shaft arm and within an interior space of the first spring;
a bushing; and
a top shaft guide having one or more outflow ports;
wherein the bushing is secured to or at least partially positioned within the top shaft guide forming a bushing-shaft guide assembly;
wherein the shaft is disposed within the body such that the shaft head is positioned between the inflow port and the bushing-shaft guide assembly;
wherein the first spring has a greater free length than the second spring such that, during inward movement of the shaft head, the first spring compresses prior to engagement and compression of the second spring;
wherein, after the first spring is compressed to a predetermined extent corresponding to a calibrated tension, the second spring engages and compresses along with the first spring to create a second pressure stage;
wherein transition between a first pressure stage and the second pressure stage occurs automatically in response to pressure without manual adjustment.

2. The valve of claim 1, wherein the body comprises one or more windows formed through an outer wall of the body to permit liquid within the internal passageway to exit out of the valve body prior to reaching and separate from the outlet end.

3. The valve of claim 1, wherein the first spring is conical in shape.

4. The valve of claim 1, wherein the first spring and the second spring made from stainless steel 316-L, the bushing made from VESCONITE or another thermopolymer material and the top shaft guide made from stainless steel 316-L.

5. The valve of claim 1, further comprising a retaining clip; wherein the body having an internal retaining groove near the outlet end, the retaining clip disposed within the retaining groove to prevent the shaft, the first spring, the second spring, and the bushing shaft guide assembly from being moved from their positions within the body and exiting out of the body at the outlet end.

6. The valve of claim 1, wherein both the first spring and the second spring are freely disposed around the shaft arm.

7. The valve of claim 1, wherein the first spring having a calibrated tension corresponding to a primary pressure stage of about 30 psi-55 psi and wherein engagement of the second spring creates a secondary pressure stage above about 55 psi.

8. The valve of claim 1 where the valve is configured to create upstream backpressure in a flowing liquid.

9. A liquid pressure control valve comprising:
a body having an inflow port at an inlet end and having an opening at an outlet end and an internal retaining groove near the outlet end;
a shaft having a shaft arm and a shaft head;
a first spring disposed around the shaft arm;
a second spring disposed around the shaft arm and within an interior space of the first spring;
a bushing;
a top shaft guide having one or more outflow ports; and
a retaining clip disposed within the retaining groove;
wherein the bushing is secured to or at least partially disposed within the top shaft guide forming a bushing shaft guide assembly;
wherein the shaft head is positioned between the inflow port and the bushing-shaft guide assembly;
wherein the first spring has a greater free length than the second spring such that compression of the first spring occurs before engagement of the second spring;
wherein the second spring becomes operational only after the shaft travels a predetermined distance;
wherein the retaining clip prevents the shaft, the first spring, the second spring and the bushing shaft guide assembly from exiting the body.

10. The valve of claim 9 where the valve is configured to create upstream backpressure in a flowing liquid.

11. The valve of claim 9, wherein the second spring being shorter in length in an expanded configuration than the first spring in its expanded configuration.

12. The valve of claim 9, wherein the body having one or more windows formed through an outer wall of the body to permit liquid within the internal passageway to exit out of the valve body prior to reaching and separate from the outlet end.

13. The valve of claim 9, wherein the first spring having a calibrated tension corresponding to a primary pressure stage of about 30 psi-55 psi and wherein engagement of the second spring creates a secondary pressure stage above about 55 psi.

14. A method of controlling pressure of water flowing through a water line through real-time pressure control adjustments comprising:
a. providing a valve body having an internal passageway;
b. disposing a movable shaft within the internal passageway;
c. disposing a first compression spring around the shaft;
d. disposing a second compression spring around the shaft and within an interior space of the first compression spring;
e. allowing water to enter the valve body and act upon the shaft to move the shaft in a direction of water flow;
f. compressing the first compression spring in response to movement of the shaft to create a primary pressure stage;
g. after the first compression spring has been compressed to a predetermined extent corresponding to a calibrated tension, engaging and compressing the second compression spring to create a secondary pressure stage; and
h. automatically transitioning from the primary pressure stage to the secondary pressure stage in response to water pressure without manual adjustment.

15. The method of real-time pressure control adjustments of claim 14, wherein the body having an internal retaining groove at an outlet end and the valve also comprising a bushing-shaft guide assembly disposed within the valve body near the outlet end between the retaining groove and the inlet end of the body, where the method further comprising the step of inserting a retaining clip in the retaining groove for maintaining the first spring, the second spring, the shaft and bush-shaft guide assembly within the body.

16. The method of real-time pressure control adjustments of claim 14, wherein the valve body comprising one or more windows formed through an outer wall of the body, and further comprising the step of allowing portions of the fluid entering an inlet end of the valve body to exit the valve body through the one or more windows prior to reaching an outlet end of the valve body.

17. The method of real-time pressure control adjustments of claim 14, wherein the first spring is longer than the second spring.

18. The method of real-time pressure control adjustments of claim 14, wherein the first spring is thicker than the second spring.

19. The method of real-time pressure control adjustments of claim 14, wherein the first spring is conical in shape.

20. The method of real-time pressure control adjustments of claim 14, wherein the first spring having a calibrated tension corresponding to a primary pressure stage of about 30 psi-55 psi and wherein engagement of the second spring creates a secondary pressure stage above about 55 psi.

* * * * *